United States Patent [19]
Cribb et al.

[11] 4,199,262
[45] Apr. 22, 1980

[54] BULK EXPLOSIVE MIXING AND DELIVERY APPARATUS

[75] Inventors: William E. Cribb, Pointe Claire; Robert J. Roach, Sudbury, both of Canada

[73] Assignee: Canadian Industries Limited, Montreal, Canada

[21] Appl. No.: 20,194

[22] Filed: Mar. 13, 1979

[30] Foreign Application Priority Data

Mar. 31, 1978 [CA] Canada .................................. 300255

[51] Int. Cl.² ........................... B28C 7/16; B28C 5/18
[52] U.S. Cl. ....................................... 366/44; 366/51; 366/184; 366/336
[58] Field of Search .................... 366/42, 44, 51, 184, 366/336, 337, 11, 349, 348, 45, 51, 262

[56] References Cited

U.S. PATENT DOCUMENTS

| 2,660,034 | 11/1953 | Kemper | 366/42 |
| 3,227,426 | 1/1966 | Williams | 366/51 |
| 3,231,245 | 1/1966 | Harvey | 366/51 |
| 3,682,446 | 8/1972 | Eron | 366/336 |
| 3,705,710 | 12/1972 | Mueller | 366/11 |

*Primary Examiner*—Robert W. Jenkins
*Attorney, Agent, or Firm*—Donald G. Ballantyne

[57] ABSTRACT

A mobile mixing and delivery apparatus for bulk slurry explosive compositions is provided. The apparatus comprises a vehicle body upon which is mounted a rotatable drum mixer. Explosive ingredients are fed into the mixer, mixed and then delivered close to the point of use where they are pumped through a hose into boreholes. Provision is made for the addition of thickness or other additives to the slurry during pumping.

9 Claims, 2 Drawing Figures

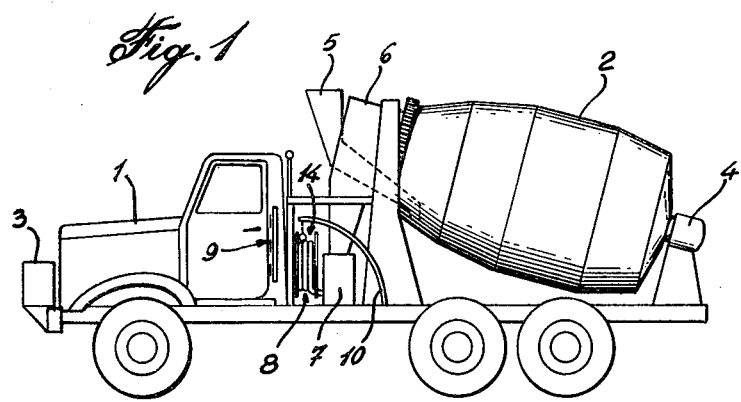
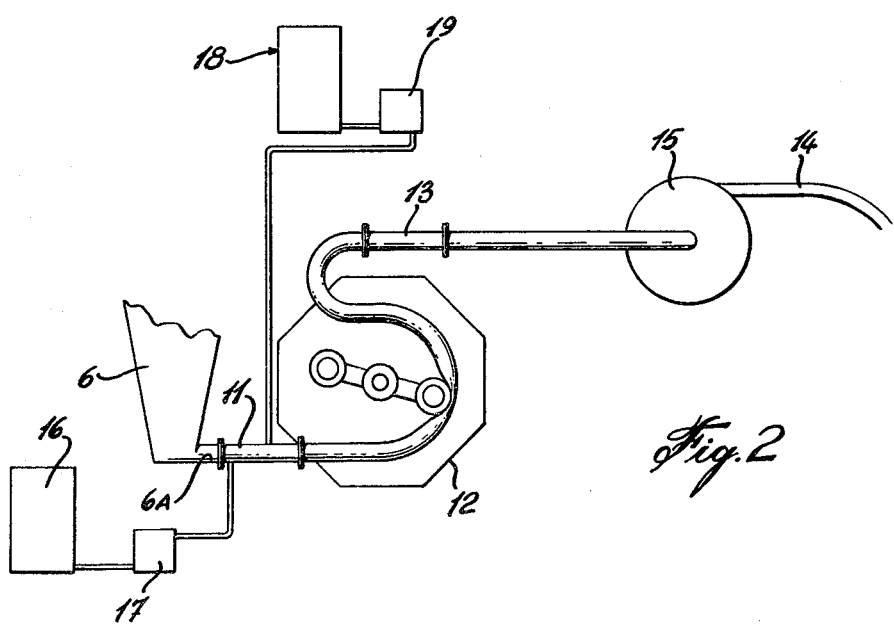

BULK EXPLOSIVE MIXING AND DELIVERY APPARATUS

The present invention related to an apparatus for the mixing and delivering of bulk slurry explosive compositions.

Slurry explosive compositions of the type described, for example, in Canadian Pat. No. 619,653 granted to M. A. Cook and H. E. Farnam on May 9, 1961, have now received wide general acceptance and extensive use in the mining and construction industries. As part of the development of slurry explosives, use has been made of a system for delivering large bulk quantities of these slurry mixtures directly to the blasting site where the explosive is pumped through a flexible hose into boreholes. Generally, two different slurry explosives bulk delivery methods have hitherto been employed. In the first such method, generally called a slurry bulk truck method, the slurry explosive composition is prepared at a stationary mixing factory where it is thereafter placed, in a semi-thickened condition, into the tank or hopper of a bulk delivery vehicle for transportation to the point of use, for example, a mine or quarry site. At the mine, the slurry is withdrawn from the delivery vehicle tank or hopper by a pump means and delivered into the borehole, usually through a connected, flexible, rubber hose. Additional thickening agents are used to gel the composition and these are normally added just prior to or during the pumping of the slurry to the borehole.

In the second well known method, generally referred to as a slurry mix truck method, the various particulate and fluid components of a slurry explosive are carried in separate bulk containers on a motor vehicle, which vehicle can then be moved close to the point of use. By means of suitable feeding systems and controls, chosen proportions of the slurry ingredients are continuously fed to a mixing station where they are combined and thereafter pumped continuously through a delivery hose directly into the boreholes. Such a method is described in detail by Robert B. Clay et al. in Canadian Pat. No. 791,560 issued on Aug. 6, 1968.

Both the slurry bulk truck method and the slurry mix truck method have been widely accepted and used in the industry. The particular advantages of the bulk truck method are the good quality control resulting from careful batch manufacture in a stationary plant and the simplicity of delivering the mixed product into the borehole by means of a start-stop delivery pump. Among the disadvantages of the bulk truck method may be noted the relatively large capital investment required for a fixed location mixing factory and a comparatively poor labour efficiency since both mixing crews and delivery crews are required.

The particular advantages of the mix truck method are a relatively low capital investments and good labour efficiency. Among the disadvantages may be noted the difficulty in maintaining product quality and the trouble sometimes experienced in the operation and control of the mixing and delivery systems.

The present invention has as its object the provision of a slurry explosives mixing and delivery system and apparatus which combines all of the advantages of both the earlier bulk truck and mix truck methods.

The bulk explosives mixing and delivery apparatus of the present invention comprises in combination a vehicular body, a rotatable mixing drum mounted on said body, motor means for rotating said drum in a clockwise and counterclockwise direction, means for charging explosive ingredients into said drum, a receiving hopper adapted to receive a mixed explosive composition from said mixing drum, conduit means connected to an outlet in said hopper, said conduit means containing at least one in-line static mixer, inlet means adjacent said in-line mixer for the injection into the area of the mixer of one or more fluid additives, pump means adapted to withdraw mixed explosives from said receiving hopper and through said conduit and in-line mixer, and flexible hose means connected downstream of said pump, conduit, and in-line mixer and adapted to direct said explosive composition to a point of use.

An understanding of a preferred form of the present invention may be obtained from a consideration of the following detailed description with reference to the accompanying drawings which show in FIG. 1, a schematic illustration of the bulk explosives mixing and delivery apparatus to which the invention relates, and in FIG. 2, a schematic plan view of the delivery portion of the apparatus.

Referring to FIG. 1, numeral 1 generally refers to a wheeled vehicle upon which is mounted a mixing drum 2. Drum 2 is rotatable in either direction by means of a hydraulic power pump 3 connected to hydraulic motor 4. A suitably mounted charging chute 5 is provided leading to the inside of drum 2 and through which raw materials are introduced into the drum mixer. Hopper 6 is mounted at the end of mixer drum 2 and is adapted to receive the mixed material from drum 2 upon the reversal of rotation of the drum. The inner wall of drum 2 (not shown), as is well known in the concrete mixing art, has secured thereto a spiral flight which functions to move the slurry contents of the drum 2 towards one or the other of its ends depending on the direction of rotation. Below hopper 6 is shown an enclosure 7 which houses a pump assembly and associated inline mixers and additive pumps further described with reference to FIG. 2. A delivery hose 14 and a powered reel assembly 8 connected to the pump assembly in housing 7, is shown. Numeral 9 indicates a control and operating panel preferably within the vehicle cab, and 10 indicates a moveable boom for supporting and positioning hose 14.

Referring to FIG. 2, there is shown receiving hopper 6 at the lower end of which is an outlet 6A. Connected to outlet 6A is a first in-line static mixer 11. Downstream of mixer 11 is peristaltic pump 12 and downstream of pump 12 is a second optional in-line mixer 13. Beyond mixer 13 and connected thereto is delivery hose 14 mounted on a power-operated hose reel 8. A first reservoir containing a fluid thickening agent is shown at 16. A pump 17 is adapted to deliver the thickener into or slightly upstream of in-line mixer 11. A second optional reservoir containing, for example, additional thickener or crosslinker or other chemical additive or mixtures of these is shown at 18. A pump 19 is adapted to deliver the contents of optional reservoir 18 into or slightly upstream of in-line mixer 13. Motive power for the operation of peristaltic pump 12 and additive pumps 17 and 19 and powered hose reel 8 is provided by hydraulic pump 3 shown in FIG. 1.

In operation, the ingredients of a slurry explosive composition, comprising water or an aqueous solution of inorganic oxidizer salts, additional particulate inorganic oxidizer salts, particulate fuels and sensitizer material are drawn from storage tanks or bins and are fed in selected proportions through chute 5 into mixer drum 2. During the period of raw material loading in drum mixer 2, the drum is rotated slowly by means of hydraulic motor 4 to prevent buildup of dry product and rotation is then continued at a predetermined speed, depending on the composition of the slurry, in order to achieve intimate mixing. As is well known in the slurry explosive art, the detonation sensitivity and strength of a slurry explosive mixture depends in part on its density. Undue or too fast mixing tends to incorporate large volumes of air in the form of small bubbles into the mixture, thus altering its density and hence its performance. Hence careful control of the speed and duration of the drum rotation is required to maintain the density of the mixture within predetermined limits. After mixing, mixer drum 2 is stopped during which time motor vehicle 1 is moved close to the point of use of the explosive. Upon reaching the blasting site, for example, a large diameter vertical borehole at a quarry, the vehicle is positioned so that hose 14 can be lowered by means of power-operated hose reel 8 and positioning boom 10 into the borehole by the truck operator. At times the mine blaster may have to direct the hose into the borehole opening, while the mixer operator prepares to discharge the explosive through the hose 14. To accomplish this, the operator has access to the control panel 19 comprising various valves and switches by means of which the following actions are caused to occur. By reversing the action of motor 4, drum 2 is rotated in an opposite direction which causes the explosive slurry content of drum 2 to be conveyed in the direction of hopper 6 into which hopper the explosive is dumped. Hopper 6 is mounted in such a way, in relationship with drum 2, that when hopper 6 is filled to a predetermined level, any further slurry is caused to flow back into drum 2. By the operation of peristaltic pump 12, the slurry mixture is withdrawn from hopper 6 and conveyed through outlet 6A, in-line mixers 11 and 13, into and through hose 14 and thence into the borehole. While the slurry is being pumped, operation of pumps 17 and 19 delivers thickening ingredients and crosslinker or other additives from reservoir 16 and 18 at a predetermined rate into the slurry where they are blended into the slurry by in-line mixers 11 and 13. By appropriate audible or visual signals, the blaster controlling the hose 14 can simply communicate with the operator at the control panel 9 and request the start or stoppage of flow of slurry through the system. Alternatively, where conditions permit, the truck operator may accomplish borehole filling unassisted by positioning his delivery vehicle so that hose 14 may be unwound from powered reel 8 and dropped into the borehole. Positioning boom 10 is provided to assist in locating the end of the hose 14 over the borehole opening. Observation of a counter device in the vehicle cab records the length of hose 14 unwound and hence, depth and capacity of the borehole can be determined. Additional counter devices in the vehicle record the volume of slurry delivered by pump 12. With these controls the truck operator may determine when the desired quantity of slurry has been placed in the boreholes.

The material of construction of the mixer drum 2 is conveniently and preferably a wear-resistant steel. It may be useful in some cases where the slurry being mixed has a corrosive effect, to coat the inner walls of drum 2 with a protective material such as, for example, an epoxy resin. The material comprising chute 5, hopper 6 and reservoir 16 and 18 may be any suitable metal or plastic which is capable of resisting chemical attack and abrasion. Aluminum and steel have been found suitable while reservoir 16 and 18 may conveniently be of polyethylene or other plastic. Peristaltic pump 12 is of the type which may be obtained, for example, from Challenge-Cook Bros. Inc. of Industry, Calif., USA. The capacity of pump 12 may be from about 250 pounds to 600 pounds or more of slurry explosives per minute. Pumps 17 and 19 may suitably be of the double acting piston type, which type has been found particularly useful in the handling of viscous liquids or suspensions at high pressures. Hose 14 is a conventional heavy-duty reinforced rubber hose of 1½ inch inside diameter, although both larger or smaller diameter hoses may be employed. The capacity of drum 2 may range from about 8 to 12 cubic yards.

EXAMPLE

At an open pit Asbestos Mine an Explosive Slurry premix liquor was prepared comprising ammonium nitrate, sodium nitrate, zinc nitrate and water. A predetermined amount of the premix liquor was loaded into the mixer drum 2 to formulate the required amount of slurry explosive needed at the blasting site. While the solution was being placed in mixer drum 2, a predetermined amount of thickening additive consisting of ethylene glycol, guar flour and lignosol was also added to the mixer. While drum 2 was rotated slowly clockwise (¾ RPM) a predetermined quantity of pelleted TNT was added through chute 5 to mixer drum 2. The speed of rotation of drum 2 was then increased (5.5 RPM) for a time sufficient to achieve thorough mixing of the composition. With drum 2 in a stopped position, the delivery vehicle was moved to the blasting site where a pattern series of 9 and 9⅞" diameter 50 to 70 foot deep vertical boreholes were to be loaded. Reservoir 16 contained a crosslinker composition comprising a 65% aqueous solution of sodium dichromate. Resevoir 18 contained additional thickner preparation. The mine blaster assisted in guiding the hose 14 from the hose reel 8 to the borehole while the mixer operator controlled the rate at which the hose was unwound. When the end of hose 14 reached the bottom of the borehole, the hose reel direction was reversed and the hose was withdrawn until the end of the hose was about 2 feet above the bottom of the borehole. The mine blaster requested that the operator deliver the appropriate number of pound of slurry into the borehole. The mixer operator selected from a chart the number of peristaltic pump rotations (counts) which correspond to the pounds of slurry required in the borehole. The operator registered the appropriate number of counts on a subtracting counter. The direction of rotation of drum 2 was reversed to a counter clockwise direction in order to fill hopper 6 with the slurry mixture. Peristaltic pump 12 was started and slurry was withdrawn from hopper 6. As the slurry was conveyed through the system to the borehole, pumps 17 and 18 were operated in order to deliver additional gelling agent and other additives into the slurry as it passed through in-line mixers 11 and 13. As the borehole was charged with slurry, the operator retracted the slurry hose 14 at a rate corresponding to the filling rate of the borehole. The position of the end of hose 14 in the borehole was monitored at the control panel by a counter device which recorded the length of hose played out by the hose reel. In this manner the level of fill of slurry in the borehole was measured and the peristaltic pump 12 stopped when the required filling level was achieved. Slurry remaining in the hose 14 can be blown into the borehole using compressed air from the delivery vehicle airbrake system.

In a like manner all of the boreholes in the pattern were filled. Detonation of the charges some days later resulted in excellent blasting results.

It may be seen from the foregoing that the bulk explosives mixing and delivery apparatus of the invention provides a convenient, efficient and economic means for charging boreholes, particularly larger diameter boreholes in open pit mining or quarrying operations. The apparatus provides a relatively simple mixing-/delivery apparatus which is easy to charge with materials, extremely simple to control and operable with low manpower requirements. The invention combines all the advantages of high product quality which is possible in bulk mixing with high mobility and accurate borehole loading.

The embodiments of the invention in which an exclusive property or privilege is claimed are defined as follows:

1. An apparatus for mixing and delivering a pumpable explosive composition and charging a borehole with same, comprising in combination:
   (a) a vehicular body,
   (b) a rotatable mixing drum mounted on said vehicular body,
   (c) motor means for rotating said drum in clockwise and counter clockwise directions,
   (d) means for charging explosive mixture ingredients into said drum,
   (e) receiving means adapted to receive a mixed explosive composition from said drum,
   (f) conduit means connected to an outlet in said receiving means, said conduit means containing at least one in-line static mixing means,
   (g) inlet means close to said in-line mixer for the addition thereto of one or more fluid additives,
   (h) pump means adapted to withdraw said mixed explosive composition from said receiving means, conduit and in-line mixer, and
   (i) flexible hose means retractably mounted on a hose reel and connected downstream of said pump, conduit and in-line mixer adapted to direct said mixed, pumped explosive composition to a point of use.

2. An apparatus as claimed in claim 1 wherein the motor means for rotating said mixing drum is a hydraulic operated motor.

3. An apparatus as claimed in claim 1 wherein the mixed explosive pump means is a peristaltic pump.

4. An apparatus as claimed in claim 1 which includes means for recording the volume of mixed explosives directed through said flexible hose means.

5. An apparatus as claimed in claim 1 wherein the said flexible hose means is adapted for mechanical play-out and retraction from said hose reel.

6. An apparatus as claimed in claim 5 which includes means for determining the length of hose played out from said hose reel.

7. An apparatus as claimed in claim 5 which includes guide means for positioning the end of said flexible hose over a vertical borehole.

8. An apparatus as claimed in claim 1 wherein the said pump means is driven hydraulically.

9. An apparatus as claimed in claim 1 wherein said mixing drum is rotatable in a clockwise and counter clockwise direction.

* * * * *